Patented Aug. 21, 1951

2,565,085

UNITED STATES PATENT OFFICE 2,565,085

PROCESS FOR PRODUCING SWEETENED CONDENSED MILK AND SIMILAR PRODUCTS

David D. Peebles, Hillsborough, Calif., assignor to Golden State Company, Ltd., San Francisco, Calif., a corporation of Delaware No Drawing. Application November 25, 1946, Serial No. 712,044

6 Claims. (Cl. 99—55)

This application is a continuation in part of my co-pending application, Serial #482,510, filed April 9, 1943, now abandoned.

This invention relates to the production of sweetened condensed milk and similar products, which are characterized as possessing a marked resistance to age-thickening and jelling.

This invention also relates to the new and improved products produced by the process of this invention, which, due to their resistance to age-thickening and jelling, can be produced with fat contents in excess of that which is normally possible and which may include products composed of cream as well as products which are purely milk-like in character.

In addition, this invention relates to the production of sweetened condensed skim milk products, which possess a marked resistance to age-thickening and jelling.

According to prevailing practice in the production of sweetened condensed milk, a mixture of fluid whole milk and cane or beet sugar is prepared. This mixture is standardized to provide the desired ratio of butterfat, milk solids-not-fat and sugar. The standardized mixture is preheated or pasteurized. This preheated or forewarmed mix is then heated in a vacuum pan to evaporate the water necessary to raise the solids content of the final product to the desired level. This viscous concentrated or condensed milk product is cooled, seeded to force crystallization of lactose and packaged. It is not necessary to sterilize sweetened condensed milk because the high concentration of sugar acts as a preservative by inhibiting bacterial activity.

In another method, utilized in the preparation of special types of condensed milk, a considerable portion of the necessary sugar is dissolved in skim milk. The mixture is concentrated until supersaturated with lactose at a temperature too low to effect sterilization of the product. The concentrated mixture of milk and sugar is cooled, is seeded and is allowed to stand until a major portion of the lactose is crystallized. The balance of the sugar, necessary to preserve the product from bacterial spoilage, is dissolved in a relatively large amount of water. This sugar solution is pasteurized and then is added to the concentrate. The diluted concentrate is then centrifuged to recover the crystallized lactose and the low lactose content condensed milk is then placed in suitable containers for storage.

It is believed that one consideration which has prompted early introduction of the sugar is that sugar is more readily soluble in the relatively large quantity of water present in the whole milk than it would be at a later point in the procedure when the quantity of water has been materially reduced. In addition, dissolving sugar in milk instead of adding sugar solution to milk reduces the quantity of water that must be removed during concentration. Another consideration is that both the milk and sugar may be pasteurized together in a single operation.

It has also been thought that the presence of the sugar during such heat treatment has entered in some way into the activity which produces the resulting resistance to age-thickening and jelling. No satisfactory explanation, however, of such possible activity has ever been advanced as far as this applicant knows. It is apparent, nevertheless, that there is general belief that some resistance to age-thickening and jelling results from the heat treatment of milk in the presence of added sugar. This supplies a definite reason why producers of sweetened condensed milk have always introduced the sugar prior to the concentration of the milk. The prevailing opinion seems to be that the mixture of milk and sugar should not be heated to too high a temperature, perhaps not higher than about 160° F.

While sweetened and condensed milk produced according to present practice has for the most part constituted a good salable product, such products still exhibit a more or less marked tendency to age-thickening or jell in the can, especially in warmer climates. This tendency has been overcome to some extent by subjecting the milk-sugar solution to a heat treatment called forewarming.

Whole milk is customarily forewarmed to destroy bacteria, molds, yeasts, etc. Further the forewarming insures that the sugar added to the milk is completely dissolved and prevents crystals of undissolved sugar from reaching the vacuum pan. This forewarming therefore precludes a too early initiation of crystallization and the development of large crystals which ruin the texture of the product.

The practice of forewarming is usually carried out at a temperature between 145° F. and 175° F. Temperatures as high as 250° F. have been suggested. When operating in the higher temperature range, the treatment is carried out by boiling the milk-sugar solution under conditions to maintain superatmospheric pressures after the sugar has been introduced but before substantial evaporation of the water is effected.

While it has been suggested that temperatures slightly above the boiling point offer additional advantages from the standpoint of maximum ferment destroying efficiency without diminishing the physical stability of the product, in prevailing practice erratic results with age-thickening of condensed milks subjected to temperatures in the 250° F. range, and the increased heat flavoring, have led to the practice of not exceeding 248° F.

The present invention, therefore, has as one of its principal objects the provision of a new procedure for producing sweetened condensed milk. The products of this new process retain all the desirable properties of the somewhat similar products previously produced by other known methods, and possess the additional advantage of a reduced tendency to age-thicken and jell. This latter characteristic is attained, moreover, without imparting an undesirable heat flavor to the product.

According to the process of this invention, the desired quantity of whole fresh milk is first placed in a pressure container and heated under pressure for a relatively short time at a temperature higher than the boiling point of milk at atmospheric pressure.

By way of example, it has been found to be satisfactory in cases where the sweetened and concentrated product is to have a solids-not-fat content of about 20% to treat the milk at a temperature of from 290° F. to 310° F. for a short period. When the temperature is increased above this range the period of treatment must be extremely short, putting a premium on control to avoid discoloring the milk by browning and imparting a heat flavor. The actual period of time during which the whole milk is held at a temperature between 290° F. to 310° F. in the preferred mode of operation is a matter of seconds, since the milk flows in a continuous process stream through the heater to the evaporation unit inlet. By increasing the period of heat treatment, temperatures as low as 265° may be utilized, but the most desirable range is that between 290° F. and 310° F.

A satisfactory time-temperature ratio may be readily established, through the use of standard tests for accelerated development of viscosity. For example, a portion of the finished product may be held at a temperature of 105° F., and the viscosity of samples, taken periodically from that portion, determined at 70° with a McMichael viscosimeter. When the temperature has been too high in relation to the time element, the samples will show a failure to develop proper viscosity and will reveal a tendency toward discoloration. When the temperature has been too low, the samples will exhibit too great a viscosity.

Such tests may also be useful in detecting the progress of cyclic variations in the reaction of the raw milk to such treatment. Such trends are well known in the milk industry and are generally believed to be caused by some obscure seasonal variation in the composition of the raw milk. By following the progress of such trends through such tests, corrections can then be made in the time-temperature ratio to counteract these cyclic variations as they occur.

After the heat treatment referred to, the milk is next subjected to a procedure whereby the desired quantity of water is removed, so that the desired degree of concentration is produced, and whereby the sugar content is greatly increased. According to this invention, it is immaterial in what order the concentration and sugar addition steps are performed except as they effect vacuum evaporation equipment performance and size.

In the preferred mode of operation, the treated milk and a hot sterilized sugar solution are simultaneously flash cooled and mixed at the inlet of the evaporation unit, and the mixture immediately enters the evaporator at a temperature below 220° F. However, the heat treated milk may be sent directly to the evaporator, without the addition of sugar, for a preliminary concentration. In this preliminary concentration, that amount of water is removed which will increase the milk solids from approximately 12½% by weight up to approximately 50%, or higher, by weight. A secondary concentration step is then necessary, after the aqueous sugar solution is added, to remove water from the resultant mixture. This secondary concentration also removes all entrapped air or oxygen that may have been introduced along with the sugar syrup. In any event, in both methods sufficient water should be removed by evaporation to raise the total solids content of the final product to approximately 72% to 75% by weight.

On the other hand, the milk alone may first be concentrated, then introduced into suitable vats or containers and the desired quantity of sugar added thereto. In this case, it is preferable to convert the sugar into a syrup before adding it to the concentrated milk, as otherwise the sugar will dissolve in the concentrated milk very slowly and with difficulty. The quantity of sugar used in producing the syrup, in relation to the quantity of milk to which it is added, is adjusted to give approximately the concentration which is commonly employed for sweetened condensed milk made in accordance with prior practices. If the sweetening is carried out by employing a syrup which is free from entrapped air or oxygen and such syrup is added carefully so that the concentration of the finished product is properly adjusted, further evaporation or adjustment of the concentration is not necessary. While such a product has keeping qualities, it lacks the translucence usually associated with sweetened condensed milks.

As stated above, in the preferred mode of operation a single evaporation step is carried out immediately after the sugar solution is added to the heat treated milk. This concentrating operation is preferably conducted according to the procedure described and claimed in applicant's copending application, Serial No. 470,179, filed December 26, 1942, now abandoned, and according to which the milk to be concentrated is projected or caused to travel at a relatively high velocity, such as, for instance, at a speed in excess of approximately 200 feet per second. While traveling at such high velocity it is interrupted in its movement, such as by forcible impingement upon an interrupting surface. Under such treatment, a substantially instantaneous evaporation of the volatile constituents of the milk takes place, caused by a substantially instantaneous conversion to heat of the kinetic energy possessed by the rapidly moving milk and by virtue of the controlled conditions of the surrounding atmosphere. This concentrating action may be conducted with commercial equipment of the type illustrated in said co-pending application or other suitable apparatus such as will carry out the same or equivalent concentrating action.

After the sweetening and evaporation treatments, above referred to, have been carried out, the product may then be put in suitable containers according to known methods.

In preparing the above referred to sugar syrups, enough sugar is dissolved in water to give a solution containing approximately 55% to 70% sugar by weight. The solution is heated to approximately 190° F. to pasteurize the same, to insure complete solution of the sugar and to remove most of the air or dissolved oxygen.

The preferred mode of operation within this invention is illustrated by the following example of continuous operation: Approximately 60,000 lbs. of whole milk having a composition of 3.6% butterfat and 8.8% milk solids-not-fat are standardized to the desired butterfat content by addition of approximately 290 lbs. of 40% cream to give a total fat content of approximately 2280 lbs. of butterfat and 5300 lbs. milk solids-not-fat. The milk is warmed to approximately 200° F. by continuous flow through an internal tubular heater and then raised to 300° F. by direct injection of steam. The hot milk flows through piping to arrive at the evaporator inlet in about 10 seconds.

At the vacuum evaporator inlet the milk is mixed with the proper proportion of a sugar syrup which is prepared by dissolving approximately 12,100 lbs. of sugar in enough water to form a 65% sugar solution and pasteurizing the resultant syrup at 190° F.

The hot mixture of milk and sugar syrup is then immediately introduced into a triple effect vacuum evaporator, as described above, and upon evaporation yields approximately 26,500 lbs. of sweetened condensed milk having the following composition:

| | Per cent by weight |
|---|---|
| Fat | 8.6 |
| Milk solids-not-fat | 20.0 |
| Sugar | 45.7 |
| H₂O | 25.7 | which is cooled, seeded and put in suitable containers.

The term "sweetened condensed milk" as used in this specification and in the appended claims refers to concentrated and sweetened milk without reference to the amount of fat present, if any, and consequently this term includes products which are milk-like in character, skim milk products, and also products which have a higher butterfat content than milk and, therefore, are in the nature of cream.

I claim:

1. The process of producing sweetened condensed milk, which comprises subjecting the milk, before sugar is added, to heat treatment at a temperature of from approximately 265° F. to approximately 310° F. for a period insufficient to brown the product but sufficient to eliminate, in the final product, the characteristic of developing excessive viscosity, thereafter, and without reference to order, adding sugar in quantity to produce, in the final product, a sugar solution closely approaching the saturation point, and concentrating the milk to produce a total solids content in the finished product, including added sugar, of from approximately 70% to approximately 75%.

2. The process of producing sweetened condensed milk, which comprises subjecting the milk, before sugar is added, to heat treatment at a temperature of from approximately 265° F. to approximately 310° F. for a period insufficient to brown the product but sufficient to eliminate, in the final product, the characteristic of developing excessive viscosity, thereafter, and without reference to order, adding sugar in quantity to produce, in the final product, a sugar solution closely approaching the saturation point, and concentrating the milk by vacuum evaporation to produce a total solids content in the finished product, including added sugar, of from approximately 70% to approximately 75%.

3. The process of producing sweetened condensed milk, which comprises subjecting the milk, before sugar is added, to heat treatment at a temperature of from approximately 265° F. to approximately 310° F. for a period insufficient to brown the product but sufficient to eliminate, in the final product, the characteristic of developing excessive viscosity, then adding a solution of approximately 55% to approximately 70% sugar by weight, and thereafter concentrating the milk and sugar mixture by vacuum evaporation to a total solids content in the finished product, including added sugar, of from approximately 70% to approximately 75%.

4. The process of producing sweetened condensed milk, which comprises subjecting the milk, before sugar is added, to heat treatment at a temperature of from approximately 265° F. to approximately 310° F. for a period insufficient to brown the product but sufficient to eliminate, in the final product, the characteristic of developing excessive viscosity, then adding a solution of approximately 55% to approximately 70% of sugar by weight while said solution is at a temperature sufficient to pasteurize the same, and next flash-cooling said milk and sugar mixture in a vacuum to a temperature below substantially 220° F. and concentrating the same to produce a final product having a total solids content, including added sugar, of from approximately 70% to approximately 75%.

5. The process of producing sweetened condensed milk, which comprises subjecting the milk, before sugar is added, to heat treatment at a temperature of from approximately 290° F. to approximately 310° F. for a period insufficient to brown the product but sufficient to eliminate, in the final product, the characteristic of developing excessive viscosity, thereafter, and without reference to order, adding sugar in quantity to produce, in the final product, a sugar solution closely approaching the saturation point, and concentrating the milk to produce a total solids content in the finished product, including added sugar, of from approximately 70% to approximately 75%.

6. The process of producing sweetened condensed milk, which comprises subjecting the milk, before sugar is added, to heat treatment at a temperature of from approximately 290° F. to approximately 310° F. for a period insufficient to brown the product but sufficient to eliminate, in the final product, the characteristic of developing excessive viscosity, then adding a solution of approximately 55% to approximately 70% of sugar by weight while said solution is at a temperature sufficient to pasteurize the same, and next flash-cooling said milk and sugar mixture in a vacuum to a temperature below substantially 220° F. and concentrating the same to produce a final product having a total solids content, including added sugar, of from approximately 70% to approximately 75%.

DAVID D. PEEBLES.

REFERENCES CITED

The following references are of record in the file of this patent:

UNITED STATES PATENTS

| Number | Name | Date |
|---|---|---|
| 324,048 | Thew | Aug. 11, 1885 |
| 1,438,502 | Peebles | Dec. 1, 1922 |
| 1,511,808 | Grindrod | Oct. 14, 1924 |
| 1,735,980 | Sadtler | Nov. 19, 1929 |
| 2,092,470 | Peebles | Sept. 7, 1937 |
| 2,140,011 | Hass | Dec. 13, 1938 |
| 2,349,227 | Thorneloe | May 16, 1944 |

OTHER REFERENCES

"Condensed Milk and Milk Powder," by O. F. Hunziker, 4th ed., published by author, La Grange, Ill, 1926, pages 45, 345 to 348, 364 and 373.